(12) United States Patent
Kishimoto et al.

(10) Patent No.: US 11,816,301 B2
(45) Date of Patent: Nov. 14, 2023

(54) ELECTRONIC APPARATUS INCLUDING SENSING COIL AND MANUFACTURING METHOD OF THE SAME

(71) Applicant: Samsung Display Co., Ltd., Yongin-si (KR)

(72) Inventors: Hirotsugu Kishimoto, Hwaseong-si (KR); Hyun-Been Hwang, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/972,886

(22) Filed: Oct. 25, 2022

(65) Prior Publication Data

US 2023/0048565 A1 Feb. 16, 2023

Related U.S. Application Data

(63) Continuation of application No. 17/092,709, filed on Nov. 9, 2020, now Pat. No. 11,513,653.

(30) Foreign Application Priority Data

Mar. 2, 2020 (KR) .................. 10-2020-0026142

(51) Int. Cl.
*G06F 3/046* (2006.01)
*G06F 3/044* (2006.01)

(52) U.S. Cl.
CPC ............ *G06F 3/046* (2013.01); *G06F 3/0447* (2019.05); *G06F 2203/04103* (2013.01)

(58) Field of Classification Search
CPC .................. G06F 3/046; G06F 3/0447; G06F 2203/04103
See application file for complete search history.

(56) References Cited

U.S. PATENT DOCUMENTS

| | | | | |
|---|---|---|---|---|
| 2010/0171891 A1* | 7/2010 | Kaji | .................... | A63F 13/2145 349/12 |
| 2014/0267951 A1* | 9/2014 | Lee | .......... | G06F 3/046 29/829 |
| 2014/0347313 A1* | 11/2014 | Lee | .......... | G06F 3/046 345/174 |
| 2017/0147115 A1* | 5/2017 | Ide | .......... | G06F 3/0445 |
| 2018/0122863 A1* | 5/2018 | Bok | .......... | H10K 50/11 |
| 2020/0227507 A1* | 7/2020 | Managaki | .............. | H10K 71/00 |

FOREIGN PATENT DOCUMENTS

| | | |
|---|---|---|
| KR | 101510294 B1 | 4/2015 |
| KR | 1020150094540 A | 8/2015 |
| KR | 1020190103872 A | 9/2019 |
| KR | 1020210016258 A | 2/2021 |

* cited by examiner

*Primary Examiner* — Lisa S Landis
(74) *Attorney, Agent, or Firm* — CANTOR COLBURN LLP

(57) ABSTRACT

An electronic apparatus includes a window, a display panel disposed on a lower surface of the window, and a digitizer disposed on a lower surface of the display panel. The digitizer includes a first photosensitive resin layer, a first sensing coil disposed on one surface of the first photosensitive resin layer, a second photosensitive resin layer disposed spaced apart from the first photosensitive resin layer, and a first adhesive layer disposed between the first photosensitive resin layer and the second photosensitive resin layer and which adheres the first photosensitive resin layer and the second photosensitive resin layer.

18 Claims, 15 Drawing Sheets

ELECTRONIC APPARATUS INCLUDING SENSING COIL AND MANUFACTURING METHOD OF THE SAME

This application is a continuation of U.S. patent application Ser. No. 17/092,709, filed on Nov. 9, 2020, which claims priority to Korean Patent Application No. 10-2020-0026142, filed on Mar. 2, 2020, and all the benefits accruing therefrom under 35 U.S.C. § 119, the content of which in its entirety is herein incorporated by reference.

BACKGROUND

The present disclosure herein relates to an electronic apparatus and a manufacturing method of the same. More specifically, the present disclosure herein relates to an electronic apparatus with improved reliability and a manufacturing method of the same.

In an information-oriented society, the importance of an electronic apparatus as a visual information delivery medium has emerged. Examples of the electronic apparatus currently known are a liquid crystal display ("LCD"), a plasma display panel ("PDP"), an organic light emitting display ("OLED"), a field effect display ("FED"), an eletrophoretic display ("EPD"), and the like.

The electronic apparatus is activated by an electrical signal applied thereto. The electronic apparatus includes a sensor for sensing an input applied from the outside of a display panel for displaying an image.

The electronic apparatus may include various electrode patterns to be activated by an electrical signal. A region in which the electrode patterns are activated either displays information or responds to a signal applied from the outside.

SUMMARY

The present disclosure provides an electronic apparatus with improved visibility and folding properties.

The present disclosure also provides a method for manufacturing an electronic apparatus with improved visibility and folding properties through a simple process.

An electronic apparatus according to an embodiment of the inventive concept includes a window, a display panel disposed on a lower surface of the window, and a digitizer disposed on a lower surface of the display panel, where the digitizer includes a first photosensitive resin layer, a first sensing coil disposed on one surface of the first photosensitive resin layer, a second photosensitive resin layer disposed spaced apart from the first photosensitive resin layer, and a first adhesive layer disposed between the first photosensitive resin layer and the second photosensitive resin layer and which adheres the first photosensitive resin layer and the second photosensitive resin layer.

In an embodiment, the digitizer may further include a second sensing coil disposed spaced apart from the first adhesive layer, and at least a portion of the second photosensitive resin layer is disposed between the second sensing coil and the first adhesive layer.

In an embodiment, the digitizer may further include a second adhesive layer disposed on the second photosensitive resin layer to cover the second sensing coil and a third photosensitive resin layer disposed spaced apart from the second photosensitive resin layer, and the second adhesive layer may be disposed between the second photosensitive resin layer and the third photosensitive resin layer.

In an embodiment, the second photosensitive resin layer may include a first sub-photosensitive resin layer which provides a reference surface on which the second sensing coil is disposed and a second sub-photosensitive resin layer disposed on the first sub-photosensitive resin layer and which covers the second sensing coil, where the first sub-photosensitive resin layer and the second sub-photosensitive resin layer may have an integral shape.

In an embodiment, the first photosensitive resin layer and the second photosensitive resin layer may include a photosensitive polyimide.

In an embodiment, each of the first photosensitive resin layer and the second photosensitive resin layer may have a storage modulus of approximately about 0.5 Gigapascals (GPa) to about 2 GPa.

In an embodiment, the first adhesive layer may cover an entire upper portion of the first sensing coil.

In an embodiment, the digitizer may further include a shielding layer disposed on a lower surface of the second photosensitive resin layer. In an embodiment, the shielding layer may contain magnetic metal powder ("MMP").

In an embodiment, an electronic apparatus according to the embodiment of the inventive concept may further include at least one of a lower film and a protection member, disposed on a lower surface of the display panel.

The digitizer may be disposed on a lower surface of a combination of the display panel, the lower film, and the protection member, between the display panel and the lower film, between the lower film and the protection member, or between the display panel and the protection member.

In an embodiment, an electronic apparatus according to the embodiment of the inventive concept may further include a folding region which is foldable with respect to a virtual folding axis extended in one direction, a first non-folding region extended toward one side of the folding region, and a second non-folding region extended toward the other side of the folding region.

In an embodiment, an electronic apparatus according to the embodiment of the inventive concept may further include at least one of a sensor disposed between the window and the display panel and an optical member.

In an embodiment, the digitizer may father include a first surface adjacent to the display panel and a second surface opposing the first surface, where the surface roughness of the first surface may be smaller than the surface roughness of the second surface.

In an embodiment, the surface roughness of the first surface may be approximately 1 micrometers (µm) to 10 µm.

In an embodiment of the inventive concept, an electronic apparatus includes a window, a display panel disposed on a lower side of the window, and a digitizer disposed on a lower side of the display panel, where the digitizer includes a first photosensitive resin layer, a first sensing coil disposed on one surface of the first photosensitive resin layer, and a first adhesive layer disposed to cover the first sensing coil, and the first photosensitive resin layer may have a storage modulus of approximately about 0.5 GPa to about 2 GPa.

In an embodiment, the first photosensitive resin layer may include a photosensitive polyimide.

In an embodiment of the inventive concept, a method for manufacturing an electronic apparatus includes disposing a display panel on a lower surface of a window, manufacturing a digitizer and disposing the digitizer on a lower surface of the display panel, where manufacturing the digitizer includes preparing a first layer by forming a sensing coil on a first photosensitive resin layer, preparing a second layer including a second photosensitive resin layer, and adhering the first layer and the second layer by providing an adhesive layer to cover the sensing coil.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
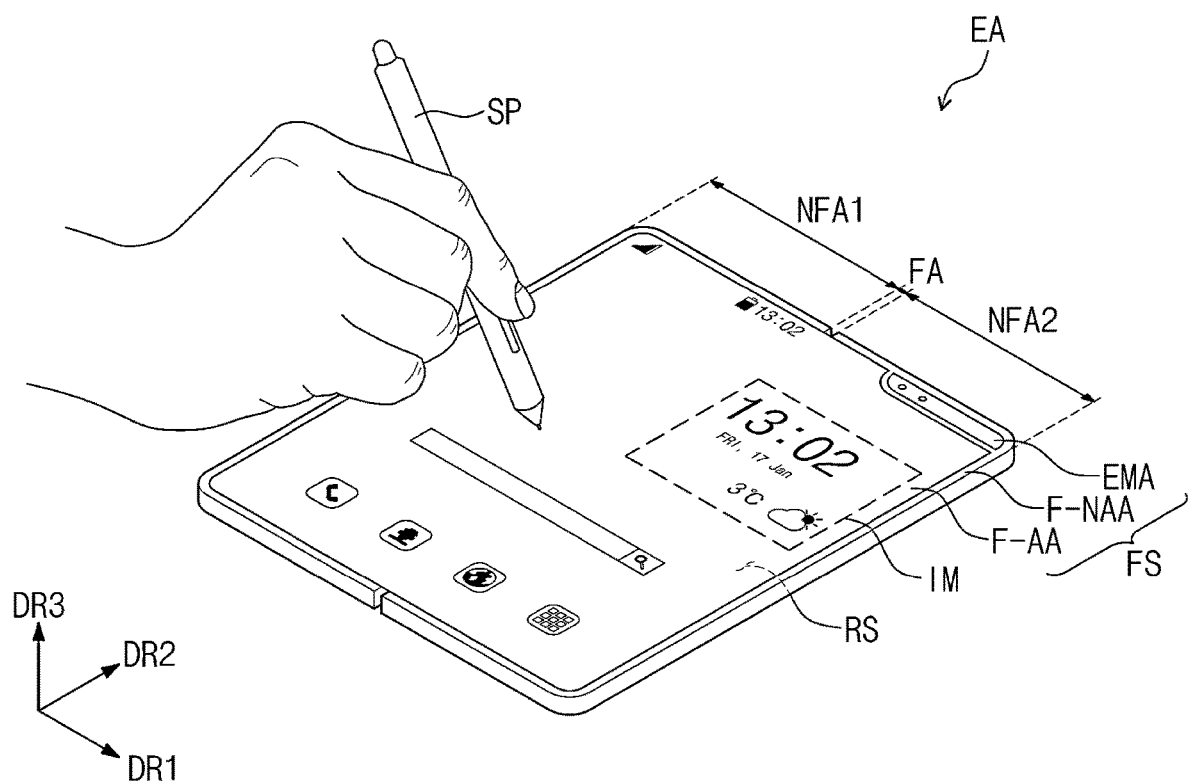
FIG. 1A is a perspective view of an electronic apparatus according to an embodiment of the inventive concept in an unfolded state.

Hereinafter, exemplary embodiments of the inventive concept will be described with reference to the accompanying drawings. In the present disclosure, when an element (or a region, a layer, a portion, etc.) is referred to as being "on," "connected to," or "coupled to" another element, it means that the element may be directly connected to/coupled to the other element, or that a third element may be disposed therebetween.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

In the present disclosure, when "a component of B is directly disposed on a component of A", it means that no separate adhesive layer and adhesive member is disposed between the component of A and the component of B.

Hereinafter, an electronic apparatus according to an embodiment of the inventive concept will be described with reference to the accompanying drawings.

Figure 1B:
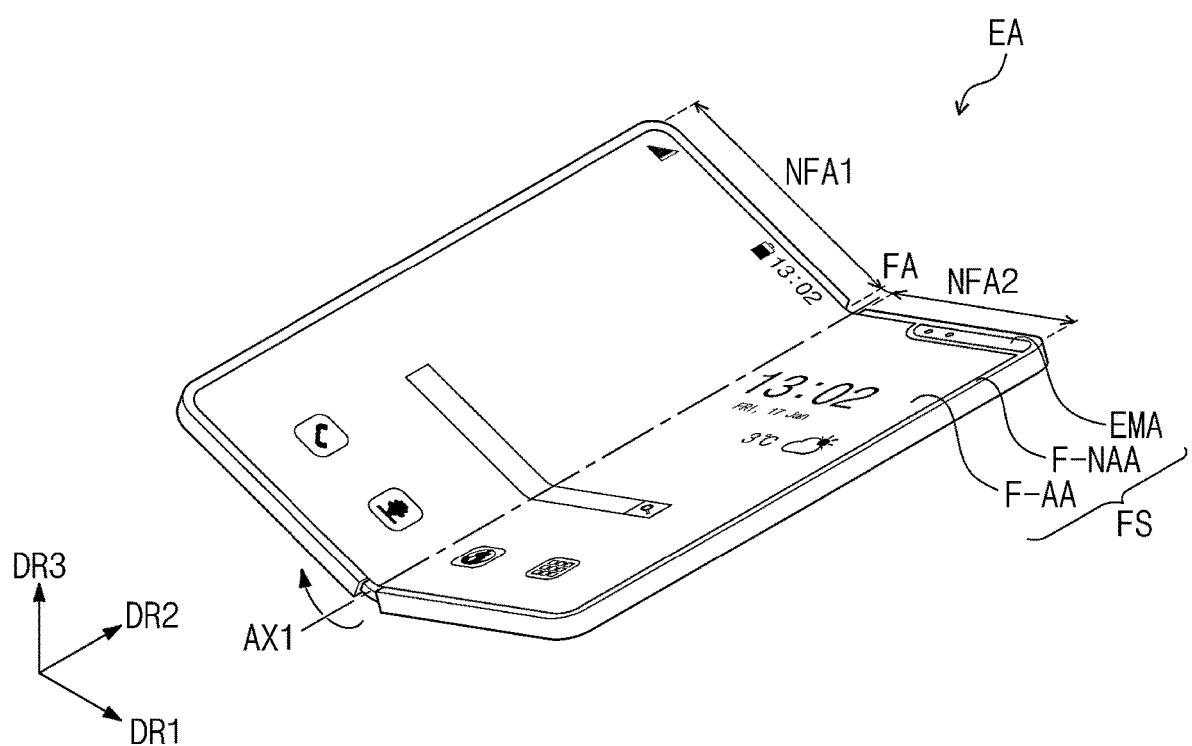
FIG. 1B is a perspective view of an electronic apparatus according to an embodiment of the inventive concept.
Figure 1C:
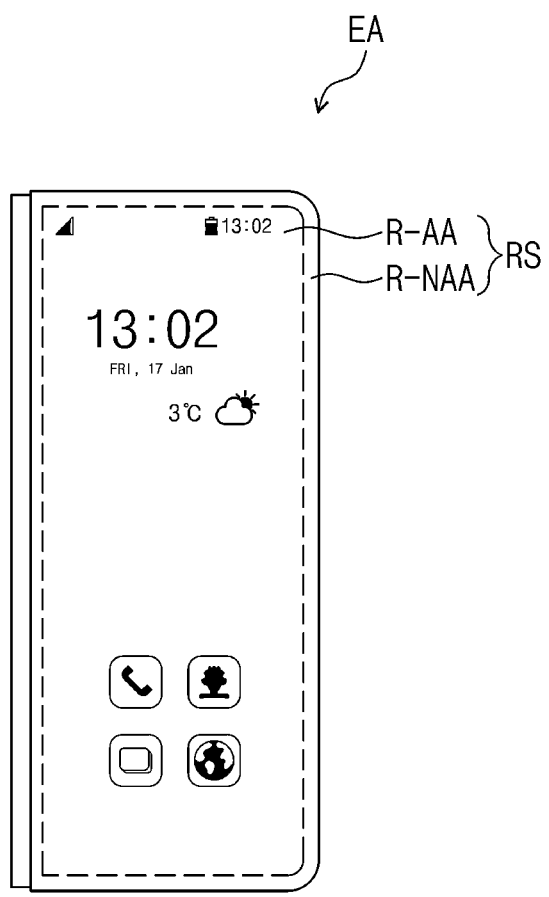
FIG. 1C is a plan view of an electronic apparatus according to an embodiment of the inventive concept in a folded state.
Figure 1D:
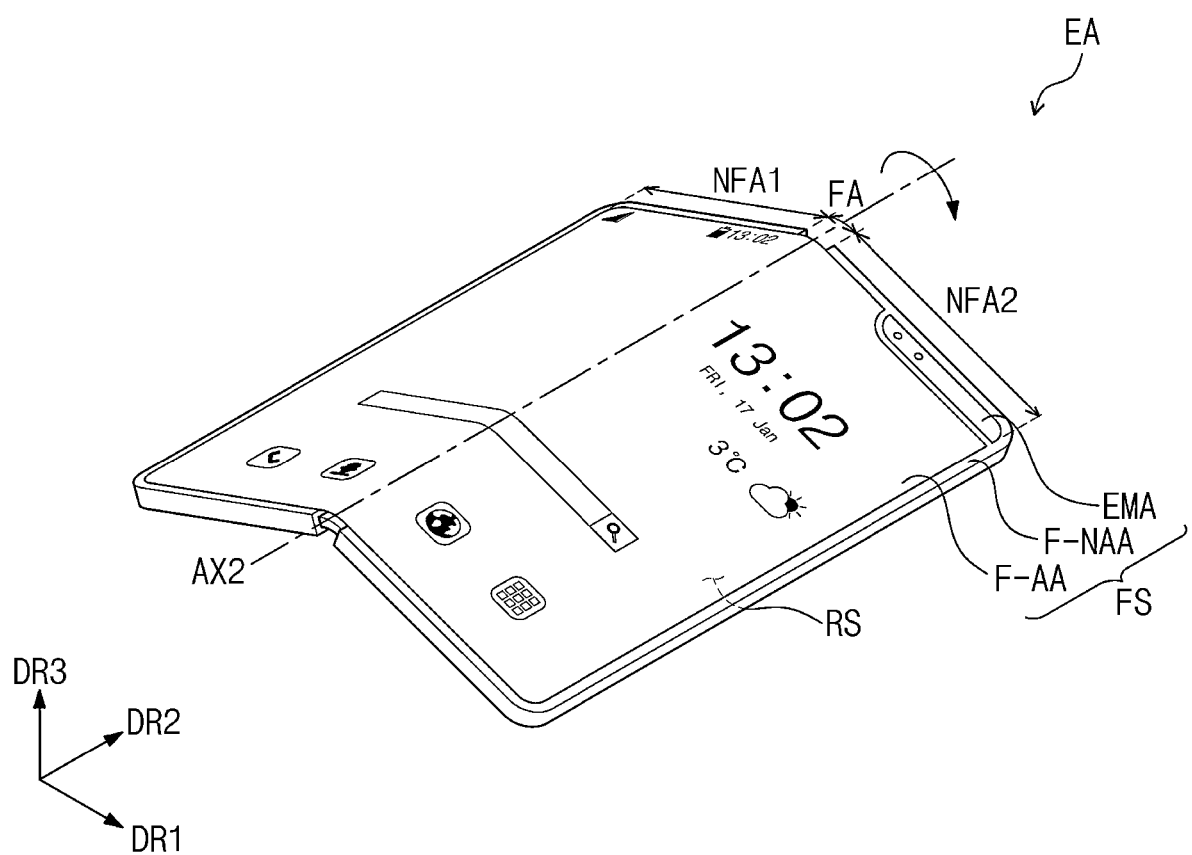
FIG. 1D is a perspective view of an electronic apparatus according to an embodiment of the inventive concept.

FIG. 1A is a perspective view of an electronic apparatus according to an embodiment of the inventive concept in an unfolded state. FIG. 1B is a perspective view of an electronic apparatus according to an embodiment of the inventive concept. FIG. 1C is a plan view of an electronic apparatus according to an embodiment of the inventive concept in a folded state. FIG. 1D is a perspective view of an electronic apparatus according to an embodiment of the inventive concept.

Referring to FIG. FIG. 1A, an electronic device EA may be a device activated by an electrical signal. An electronic apparatus EA may include various embodiments. For example, the electronic apparatus EA may be a tablet, a notebook computer, a computer, a smart television, and the like. Here, the electronic apparatus EA is exemplarily illustrated as being a smart phone.

The electronic apparatus EA may display an image IM toward a third direction DR3 on a first display surface FS parallel to each of a first direction DR1 and a second direction DR2. The first display surface FS on which the image IM is displayed may correspond to a front surface of the electronic apparatus EA. The image IM may include both a moving image and a still image. In FIG. 1A, as an example of the image IM, an Internet search window, a weather display, an icon, or the like is illustrated.

In an embodiment, a front surface (i.e., an upper surface) and a rear surface (i.e., a lower surface) of each member of the electronic device EA are defined with respect to a direction in which the image IM is displayed. The front surface and the rear surface oppose each other in the third direction DR3 and the normal direction of each of the front surface and the rear surface may be parallel to the third direction DR3.

The separation distance of the front surface and the rear surface in the third direction DR3 may correspond to the thickness/height of the electronic apparatus EA in the third direction DR3. Directions indicated by the first to third directions DR1, DR2, and DR3 are a relative concept, and therefore, may be converted to different directions. Hereinafter, first to third directions are directions indicated by the first to third directions DR1, DR2, and DR3, respectively, and are given the same reference numerals.

The electronic apparatus EA may sense an external input applied from the outside. The external input may include various forms of input provided from the outside of the electronic apparatus EA.

For example, the external input may include not only a contact by a part of a user's body, such as a hand, but also an external input applied by close proximity, or adjacent to the electronic apparatus EA at a predetermined distance (for example, hovering). Also, the external input may have various forms such as force, pressure, temperature, light, and the like.

In FIG. 1A, an input by a hand and an external input through a pen SP are exemplarily illustrated. Although not illustrated, the pen SP may be mounted on and demounted from the electronic apparatus EA, and the electronic apparatus EA may provide or receive a signal corresponding to the mounting and demounting of the pen SP.

The electronic apparatus EA according to an embodiment includes the first display surface FS (i.e., upper surface of the electronic apparatus EA in the unfolded state) and a second display surface RS (i.e., lower surface of the electronic apparatus EA in the unfolded state). The first display surface FS may include a first active region F-AA, a first peripheral region F-NAA, and an electronic module region EMA. The second display surface RS may be defined as a surface opposing the first display surface FS.

The first active region F-AA may be a region activated by an electrical signal. The first active region F-AA is a region on which an image IM is displayed and which may sense an external input of various forms. The first peripheral region F-NAA is adjacent to the first active region F-AA. The first peripheral region F-NAA may have a predetermined color. The first peripheral region F-NAA may surround the first active region F-AA. Accordingly, the shape of the first active region F-AA may be substantially defined by the first peripheral region F-NAA. However, this is only exemplary. The first peripheral region F-NAA may be disposed adjacent to only one side of the first active region F-AA, or may be omitted in another embodiment. The electronic apparatus according to an embodiment of the inventive concept may include various embodiments, and is not limited to any one embodiment.

The electronic module region EMA may have various electronic modules disposed therein. For example, an electronic module may include at least one of a camera, a speaker, a light sensor, or a heat sensor. The electronic module region EMA may sense an external object received through the display surfaces FS and RS, or may provide a sound signal such as voice to the outside through the display surfaces FS and RS. An electronic module may include a plurality of components, and is not limited to any one embodiment.

The electronic module region EMA may be surrounded by any one of the first active region F-AA and the first peripheral region F-NAA. However, the embodiment of the inventive concept is not limited thereto. The electronic module region EMA may be disposed inside the first active region F-AA in another embodiment.

The electronic apparatus EA according to an embodiment may include at least one folding region FA and a plurality of non-folding regions NFA1 and NFA2 extended from the folding region FA.

Referring to FIG. 1B, the electronic apparatus EA includes a virtual first folding axis AX1 extended in the second direction DR2. The first folding axis AX1 may be extended along the second direction DR2 on the first display surface FS. In an embodiment, the non-folding regions NFA1 and NFA2 may be extended from the folding region FA, and the folding region FA may be disposed between the non-folding regions NFA1 and NFA2. For example, a first non-folding region NFA1 may be extended along the first direction DR1 to reach one side of the folding region FA in the unfolded state, and a second non-folding region NFA2 may be extended along the first direction DR1 to reach the other side of the folding region FA in the unfolded state.

The electronic apparatus EA may be folded with respect to the first folding axis AX1 and transformed into an in-folding state in which the first non-folding region NFA1 of the first display surface FS faces the second non-folding region NFA2 of the first display surface FS.

Referring to FIG. 1C, in the in-folding state, the second display surface RS of the electronic apparatus EA according to an embodiment may be visible to a user. At this time, the second display surface RS may include a second active region R-AA for displaying an image. The second active region R-AA may be a region activated by an electrical signal. The second active region R-AA is a region on which an image is displayed and which may sense an external input of various forms.

A second peripheral region R-NAA is adjacent to the second active region R-AA. The second peripheral region R-NAA may have a predetermined color. The second peripheral region R-NAA may surround the second active region R-AA. Also, although not illustrated, the second display surface RS may also further include an electronic module region in which an electronic module including various components is included, and is not limited to any one embodiment.

Referring to FIG. 1D, the electronic apparatus EA according to an embodiment includes a virtual second folding axis AX2 extended in the second direction DR2. The second folding axis AX2 may be extended along the second direction DR2 on the second display surface RS.

The electronic apparatus EA may be folded with respect to the second folding axis AX2 and transformed into an out-folding state in which the first non-folding region NFA1 of the second display surface RS faces the second non-folding region NFA2 of the second display surface RS.

However, the embodiment of the inventive concept is not limited thereto. In another embodiment, the electronic apparatus EA may be folded with respect to a plurality of folding axes such that portions of the first display surface FS or portions of the second display surface RS may be folded to face each other, and the number of folding axes and the number of non-folding region accordingly are not limited to any one embodiment.

Figure 2A:
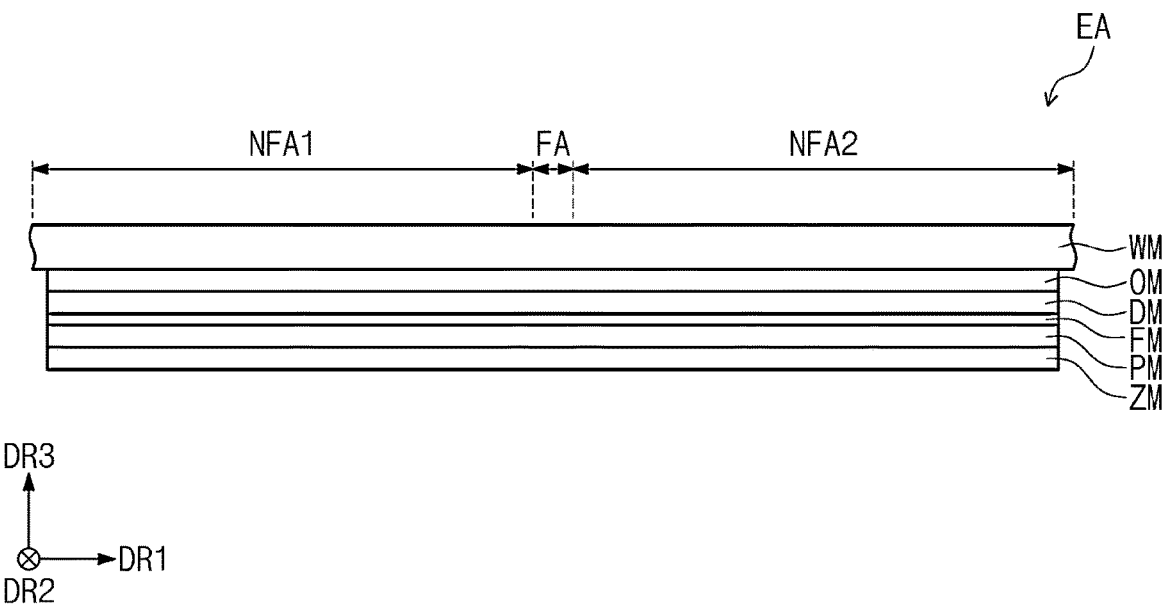
FIG. 2A is a cross-sectional view of an electronic apparatus according to an embodiment of the inventive concept.
Figure 2B:
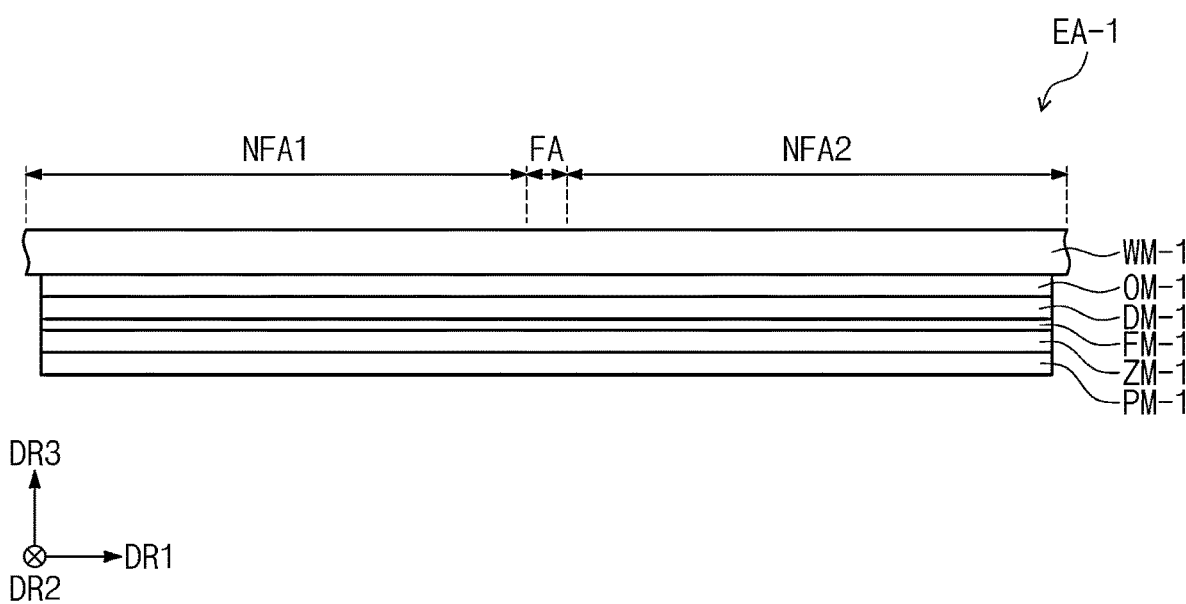
FIG. 2B is a cross-sectional view of an electronic apparatus according to another embodiment of the inventive concept.
Figure 2C:
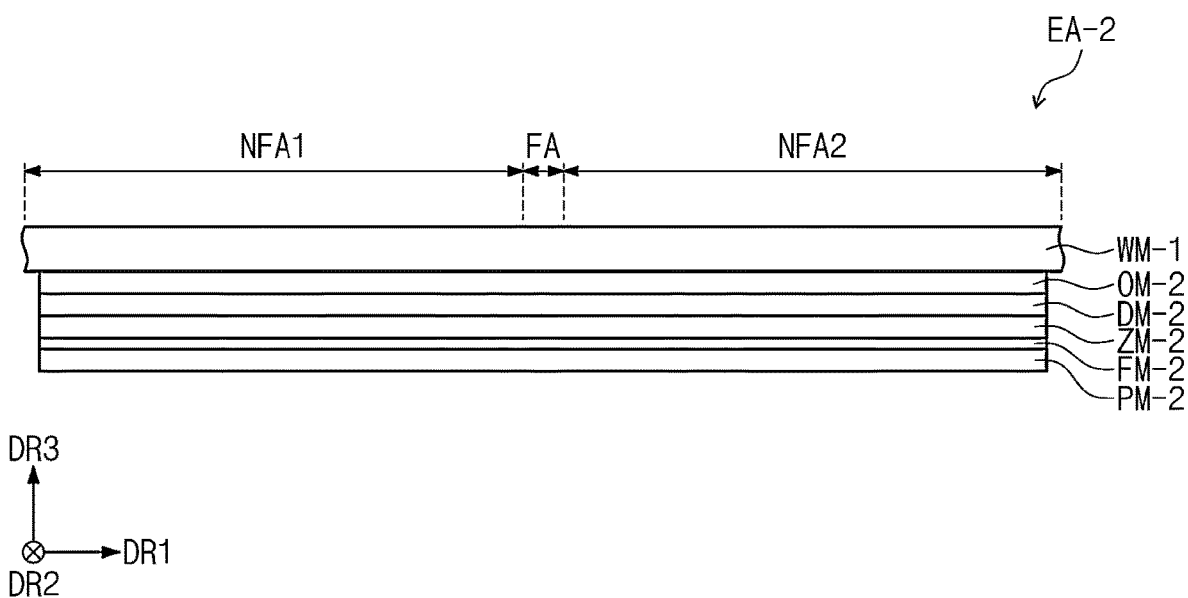
FIG. 2C is a cross-sectional view of an electronic apparatus according to still another embodiment of the inventive concept.
Figure 3A:
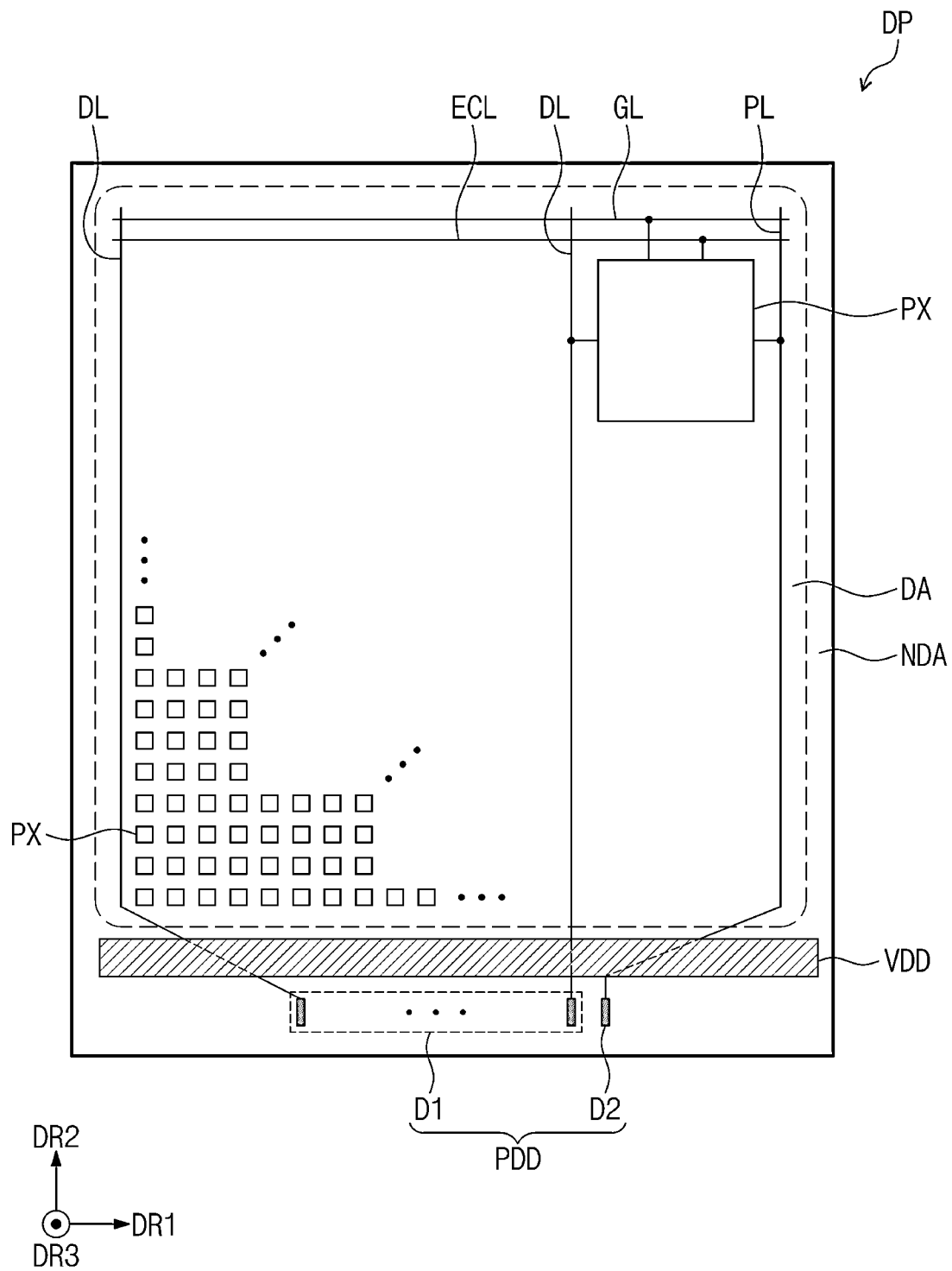
FIG. 3A is a plan view of a display panel according to an embodiment of the inventive concept.
Figure 3B:
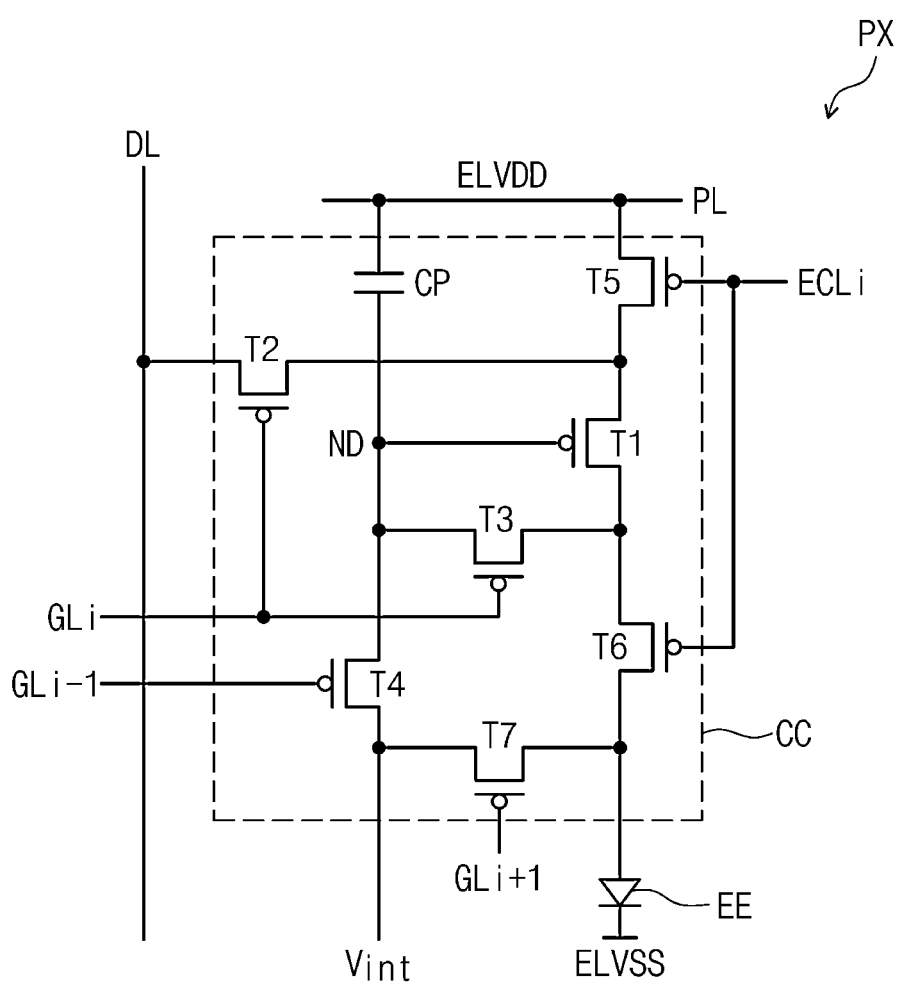
FIG. 3B is an equivalent circuit diagram of a pixel according to an embodiment of the inventive concept.
Figure 4:
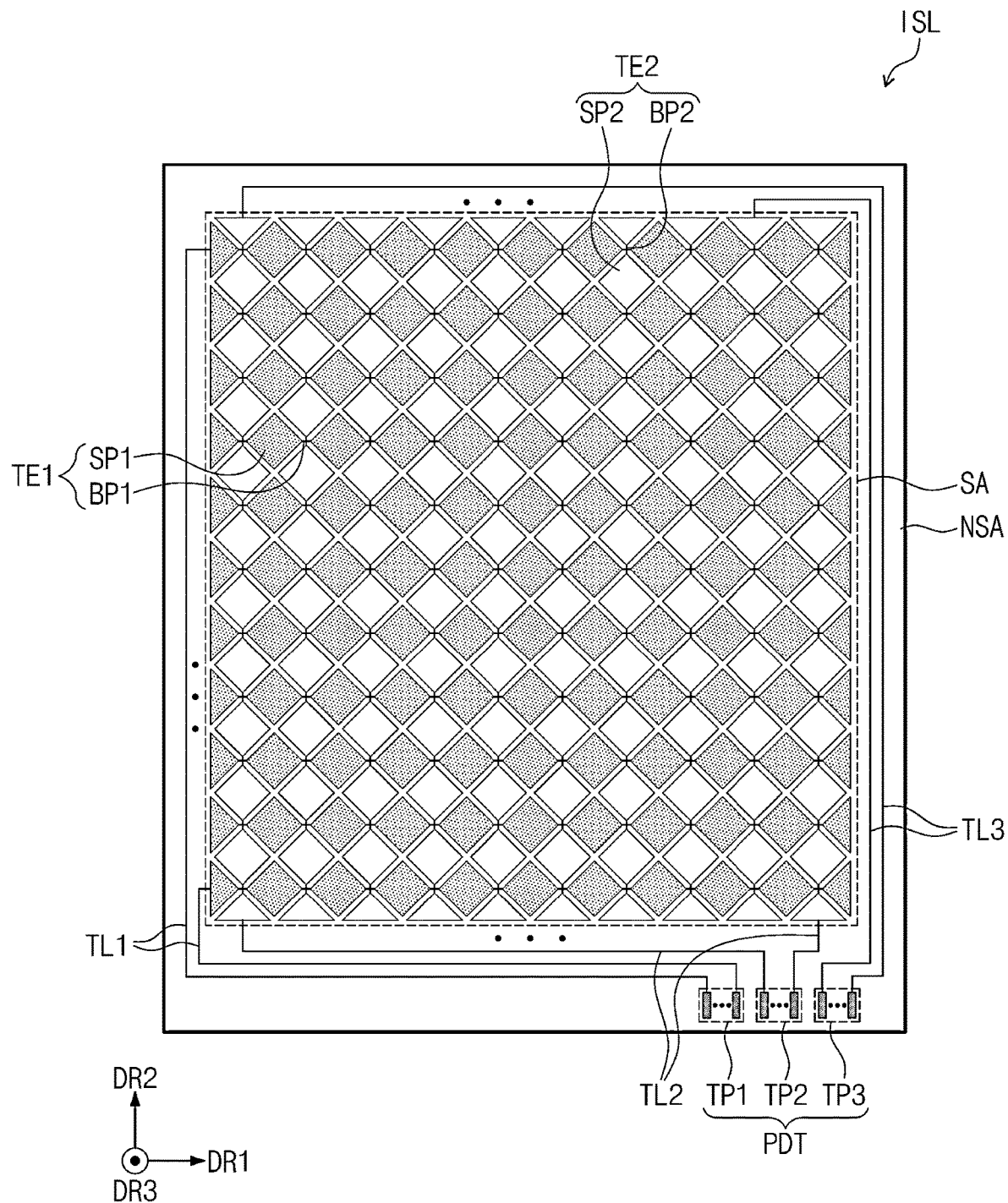
FIG. 4 is a plan view of a sensor according to an embodiment of the inventive concept.

FIG. 2A is a cross-sectional view of an electronic apparatus according to an embodiment of the inventive concept. FIG. 2B is a cross-sectional view of an electronic apparatus according to another embodiment of the inventive concept. FIG. 2C is a cross-sectional view of an electronic apparatus according to still another embodiment of the inventive concept. FIG. 3A is a plan view of a display panel according to an embodiment of the inventive concept. FIG. 3B is an equivalent circuit diagram of a pixel according to an embodiment of the inventive concept. FIG. 4 is a plan view of a sensor according to an embodiment of the inventive concept. The same reference numerals are used for the same components as those of FIG. 1A to FIG. 1D, and redundant descriptions thereof are omitted. FIG. 2A to FIG. 2C schematically illustrate a cross-sectional view of an electronic apparatus according to an embodiment of the inventive concept.

Referring to FIG. 2A, the electronic apparatus EA according to an embodiment may include a window WM, an optical member OM, a display module DM, a lower film FM, a protective member PM and a digitizer ZM.

The window WM is disposed on the display module DM. The window WM provides the display surfaces FS and RS of the electronic apparatus EA and protects the display module DM. The window WM may include a material having a high light transmittance rate. For example, the window WM may include a glass substrate, a sapphire substrate, or a plastic film. The window WM may have a multi-layered structure or a single-layered structure. For example, the window WM may have a laminated structure in which a plurality of plastic films is adhered to each other with an adhesive, or a laminated structure in which a glass substrate and a plastic film are adhered to each other with an adhesive.

One region of the window WM through which light generated from the display module DM is transmitted may be defined as the first active region F-AA of the first display surface FS, and a bezel region of the window WM may be defined as the first peripheral region F-NAA of the first display surface FS. Also, the other region of the window WM through which light generated from the display module DM is transmitted may be defined as the second active region R-AA of the second display surface RS, and a bezel region of the window WM may be defined as the second peripheral region R-NAA.

The optical member OM is disposed on a lower portion of the window WM. The optical member OM may reduce the external light reflectance rate of the display module DM for light incident on the display module DM. For example, the optical member OM may include at least one of an anti-reflection film, a polarizing film, a color filter, or a gray filter.

The display module DM may function as an output device. For example, the display module DM may display an image on the active regions F-AA and R-AA, and a user may obtain information through the image. In addition, the display module DM may function as an input device for sensing an external input applied to the active regions F-AA and R-AA.

The display module DM according to an embodiment may include a display panel DP and a sensor ISL.

Referring to FIG. 3A, the display panel DP may include a plurality of pixels PX, a plurality of signal lines GL, DL, PL, and ECL, and a plurality of display pads PDD.

A display region DA of the display panel DP may be a region on which an image is displayed, and a non-display region NDA of the display panel DP may be a region on which a driving circuit, a driving line, and the like may be disposed. The display region DA may overlap at least a portion of the active regions F-AA and R-AA of the electronic apparatus EA in a plan view (i.e., view from the third direction DR3). Also, the non-display region NDA may overlap the peripheral regions F-NAA and R-NAA of the electronic apparatus EA in a plan view.

The plurality of signal lines GL, DL, PL, and ECL are connected to the pixels PX and transmit electrical signals to the pixels PX. Among signal lines included in the display panel DP, a scan line GL, a data line DL, a power supply line PL, and a light emission control line ELC are exemplarily illustrated. However, this is just exemplary. The signal lines GL, DL, PL, and ECL may further include an initialization voltage line, and are not limited to any one embodiment. The pixels PX may be arranged spaced apart from each other along the first direction DR1 and the second direction DR2 and may have a matrix shape on a plane defined by the first direction DR1 and the second direction DR2.

Referring to FIG. 3B, an enlarged signal circuit diagram of one pixel PX among the plurality of pixels is exemplarily illustrated. FIG. 3B exemplarily illustrates the pixel PX connected to an $i^{th}$ scan line GLi and an $i^{th}$ light emission control line ECLi.

The pixel PX may include a light emitting element EE and a pixel circuit CC. The pixel circuit CC may include a plurality of transistors T1 to T7 and a capacitor CP. The plurality of transistors T1 to T7 may be formed through a low temperature polycrystalline silicon ("LTPS") process or a low temperature polycrystalline oxide ("LTPO") process.

The pixel circuit CC controls the amount of current flowing through the light emitting element EE in correspondence to a data signal supplied from the data line DL. The light emitting element EE may emit light to a predetermined luminance in correspondence to the amount of current provided from the pixel circuit CC. To this end, the level of a first power ELVDD may be set to be higher than the level of a second power ELVSS. The light emitting element EE may include an organic light emitting element or a quantum dot light emitting element.

Each of the plurality of transistors T1 to T7 may each include an input electrode (i.e., a source electrode), an output electrode (i.e., a drain electrode), and a control electrode (i.e., a gate electrode). In the present disclosure, any one of the input electrode and the output electrode may be referred to as a first electrode, and the other one thereof may be referred to as a second electrode for convenience.

The first electrode of a first transistor T1 is connected to the first power ELVDD via a fifth transistor T5, and the second driving electrode of the first transistor T1 is connected to an anode electrode of the light emitting element EE via a sixth transistor T6. The first transistor T1 may be referred to as a driving transistor in the present disclosure.

The first transistor T1 controls the amount of current flowing through the light emitting element EE in correspondence to a voltage applied to a control electrode of the first transistor T1.

A second transistor T2 is connected between the data line DL and the first electrode of the first transistor T1. In addition, a control electrode of the second transistor T2 is connected to the $i^{th}$ scan line GLi. The second transistor T2 is turned on when an $i^{th}$ scan signal is provided to the $i^{th}$ scan line GLi, and electrically connects the data line DL and the first electrode of the first transistor T1.

A third transistor T3 is connected between the second electrode of the first transistor T1 and the control electrode of the first transistor T1. A control electrode of the third transistor T3 is connected to the $i^{th}$ scan line GLi. The third transistor T3 is turned on when the $i^{th}$ scan signal is provided to the $i^{th}$ scan line GLi, and electrically connects the second electrode of the first transistor T1 and the control electrode of the first transistor T1. Accordingly, when the third transistor T3 is turned on, the first transistor T1 is connected in the form of a diode.

A fourth transistor T4 is connected between a node ND and an initialization power generating unit (not shown). In addition, a control electrode of the fourth transistor T4 is connected to an i−$1^{st}$ scan line GLi−1. The fourth transistor T4 is turned on when an i−$1^{st}$ scan signal is provided to the i−$1^{st}$ scan line GLi−1, and provides an initialization voltage Vint to the node ND.

A fifth transistor T5 is connected between the power supply line PL and the first electrode of the first transistor T1. A control electrode of the fifth transistor T5 is connected to the $i^{th}$ light emission control line ECLi.

A sixth transistor T6 is connected between the second electrode of the first transistor T1 and the anode electrode of the light emitting element EE. In addition, a control electrode of the sixth transistor T6 is connected to the $i^{th}$ light emission control line ECLi.

A seventh transistor T7 is connected between the initialization power generating unit (not shown) and the anode electrode of the light emitting element EE. In addition, a control electrode of the seventh transistor T7 is connected to an i+$1^{st}$ scan line GLi+1. The seventh transistor T7 is turned on when an i+$^{st}$ scan signal is provided to the i+$^{st}$ scan line GLi+1, and provides the initialization voltage Vint to the anode electrode of the light emitting element EE.

The seventh transistor T7 may improve the capability of the pixel PX expressing black color. Specifically, when the seventh transistor T7 is turned on, a parasitic capacitor (not shown) of the light emitting element EE is discharged. Then, when black luminance is implemented, the light emitting element EE does not emit light due to a leakage current from the first transistor T1, and accordingly, the capability of expressing black may be improved.

Additionally, FIG. 3B illustrates the control electrode of the seventh transistor T7 being connected to the i+$^{st}$ scan line GLi+1, but the embodiment of the inventive concept is not limited thereto. In another embodiment of the inventive concept, the control electrode of the seventh transistor T7 may be connected to the $i^{th}$ scan line GLi or the i−$^{st}$ scan line GLi−1.

The capacitor CP is disposed between the power supply line PL and the node ND. The capacitor CP stores a voltage corresponding to a data signal. When the fifth transistor T5 and the sixth transistor T6 are turned on in accordance with the voltage stored in the capacitor CP, the amount of current flowing through the first transistor T1 may be determined.

According to the inventive concept, an equivalent circuit of the pixel PX is not limited to the equivalent circuit illustrated in FIG. 3B. In another embodiment of the inventive concept, the pixel PX may be implemented in various forms for emitting the light emitting element EE. Although FIG. 3B illustrates a PMOS as a reference, the embodiment of the inventive concept is not limited thereto. In another embodiment of the inventive concept, the pixel circuit CC may be formed of an NMOS. In yet another embodiment of the inventive concept, the pixel circuit CC may be formed of a combination of an NMOS and a PMOS.

Referring back to FIG. 3A, a power supply pattern VDD is disposed in the non-display region NDA. In an embodiment, the power supply pattern VDD is connected to a plurality of power lines PL. Accordingly, the display panel DP includes the power supply pattern VDD, thereby providing the same first power signal to the plurality of pixels PX.

The display pads PDD may include a first pad D1 and a second pad D2. The first pad D1 may be provided in a plurality, and the plurality of the first pad D1 is connected to the data lines DL, respectively. The second pad D2 is connected to the power supply pattern VDD to be electrically connected to the power supply line PL. The display panel DP may provide electrical signals provided from the outside through the display pads PDD to the pixels PX. The display pads PDD may further include pads for receiving other electrical signals in addition to the first pad D1 and the second pad D2, and are not limited to any one embodiment.

Referring to FIG. 4, the sensor ISL may be disposed on the display panel DP. The sensor ISL may be coupled to the display panel DP through a separate adhesive layer. Also, the sensor ISL may be directly formed on the display panel DP by a continuous manufacturing process, and is not limited to any one embodiment.

The sensor ISL may include a first sensing electrode TE1, a second sensing electrode TE2, a plurality of sensing lines TL1, TL2, and TL3, and a plurality of sensing pads PDT (TP1, TP2, and TP3). The sensor ISL may have a sensing region SA and a non-sensing region NSA defined thereon. The non-sensing region NSA may surround the sensing region SA. The sensing region SA may be a sensing area in which an input applied from the outside is sensed. The sensing region SA may overlap the display region DA of the display panel DP in a plan view (i.e., view from the third direction DR3).

The sensor ISL may sense an external input by any one of a self-capacitance type method or a mutual capacitance type method. The first sensing electrode TE1 and the second sensing electrode TE2 may be variously modified, disposed and connected in accordance with a method.

The first sensing electrode TE1 may include first sensing patterns SP1 and first connecting patterns BP1. The first sensing electrode TE1 may be extended along the first direction DR1 and arranged along the second direction DR2 to have a diamond grid pattern shown in FIG. 4. The first sensing patterns SP1 may be spaced apart and arranged along the first direction DR1. At least one first connecting pattern BP1 may be connected to two first sensing patterns SP1 adjacent to each other.

The second sensing electrode TE2 may include second sensing patterns SP2 and second connecting patterns BP2. The second sensing electrode TE2 may be extended along the second direction DR2 and arranged along the first direction DR1 to have a diamond grid pattern shown in FIG. 4. The second sensing patterns SP2 may be spaced apart and arranged along the second direction DR2. At least one second connecting pattern BP2 may be connected to two second sensing patterns SP2 adjacent to each other.

The sensing lines TL1, TL2, and TL3 are disposed in the non-sensing region NSA. The sensing lines TL1, TL2, and T3 may include a first sensing line TL1, a second sensing line TL2, and a third sensing line TL3.

The first sensing lines TL1 are connected to the first sensing electrode TE1. The second sensing lines TL2 are connected to one end of the second sensing electrode TE2. The third sensing lines TL3 are connected to the other end of the second sensing electrode TE2. The other end of the sensing electrode TE2 may be a portion opposing the one end of the second electrode TE2.

According to the inventive concept, the second sensing electrode TE2 may be connected to the second sensing lines TL2 and the third sensing lines TL3. Accordingly, sensitivity according to a region may be uniformly maintained for the second sensing electrode TE2, which is relatively long compared to the first sensing electrode TE1. However, this is just exemplarily illustrated. The third sensing line TL3 may be omitted, and is not limited to any one embodiment.

The sensing pads TP1, TP2, and TP3 are disposed in the non-sensing region NSA. The sensing pads TP1, TP2, TP3 may include a first sensing pads TP1, a second sensing pads TP2, and a third sensing pads TP3. The first sensing pad TP1 is connected to the first sensing line TL1 to be electrically connected to the first sensing electrode TE1. The second sensing pad TP2 is connected to the second sensing line TL2, and the third sensing pad TP3 is connected to the third sensing line TL3. Therefore, the second sensing pad TP2 and the third sensing pad TP3 are electrically connected to the second sensing electrode TE2.

Referring back to FIG. 2A, the lower film FM is disposed on a lower portion of the display module DM. The lower film FM may reduce stress applied to the display module DM when the electronic apparatus EA is folded. Also, the lower film FM may prevent external moisture from penetrating the display module DM and adsorb an external impact.

The lower film FM may include a plastic film as a base layer. The lower film FM may include a plastic film containing any one selected from the group consisting of polyethersulfone ("PES"), polyacrylate, polyetherimide ("PEI"), polyethylenenaphthalate ("PEN"), polyethyleneterephthalate ("PET"), polyphenylene sulfide ("PPS"), polyarylate, polyimide ("PI"), polycarbonate ("PC"), poly (arylene ethersulfone), and a combination thereof.

A material constituting the lower film FM is not limited to plastic resins, and may include an organic/inorganic composite material in another embodiment. The lower film FM may include a porous organic layer and an inorganic material filled in pores of the organic layer.

The lower film FM may further include a functional layer disposed on the plastic film. The functional layer may include a resin layer. The functional layer may be formed by coating.

The protective member PM is disposed on a lower portion of the lower film FM. The protective member PM may include at least one functional layer for protecting the display module DM. For example, the protective member PM may include a light blocking layer, a heat dissipating layer, a cushion layer, and a plurality of adhesive layers.

The light blocking layer may serve to solve a problem that components disposed in the display module DM are projected on the window WM through the active regions F-AA and R-AA. Although not illustrated, the light blocking layer may include a binder and a plurality of pigment particles dispersed therein. The pigment particles may include carbon black. The electronic apparatus EA according to an embodiment includes the protective member PM having the light blocking layer, and thus, an effect of improving light blocking properties may be achieved.

The heat dissipating layer may effectively dissipate heat generated in the display module DM. The heat dissipating layer may include at least any one of graphite, copper (Cu), or aluminum (Al) which have good heat dissipating properties, but is not limited thereto. The heat dissipating layer not only improves heat dissipating properties but may also have electromagnetic wave shielding properties or electromagnetic wave absorbing properties.

The cushion layer may be synthetic resin foam. The cushion layer may include a matrix and a plurality of pores. The cushion layer has elasticity and may have a porous structure.

The matrix may include a flexible material. The matrix includes a synthetic resin. For example, the matrix may include at least any one of acrylonitrile butadiene styrene copolymer ("ABS"), polyurethane ("PU"), polyethylene ("PE"), ethylene vinyl acetate ("EVA"), or polyvinyl chloride ("PVC").

The plurality of pores easily absorb impact applied to the cushion layer. The plurality of pores may be defined as the cushion layer has a porous structure.

However, the embodiment of the inventive concept is not limited thereto. In another embodiment, at least any one of the light blocking layer, the heat dissipating layer, or the cushion layer may be omitted, or a plurality of layers may be provided as a single layer, but the inventive concept is not limited to any one embodiment.

The digitizer ZM is disposed on a lower portion of the display module DM. The digitizer ZM may sense a signal transmitted by the pen SP (see FIG. 1A) among external inputs. The digitizer ZM may sense an external input by an ElectroMagnetic Resonance ("EMR") method. By the electromagnetic resonance (EMR) method, a magnetic field is generated in a resonance circuit inside the pen SP, and then the vibrating magnetic field induces a signal in a plurality of coils included in the digitizer ZM. Through the signal induced in the coils, the position of the pen SP is detected. The digitizer ZM will be described later.

In an embodiment, the digitizer ZM, the protective member PM, the lower film FM, the display module DM, and the optical member OM of the electronic apparatus EA may be sequentially disposed along the third direction DR3. Therefore, in an embodiment, the digitizer ZM may be disposed on a lower portion of the protective member PM which is disposed at lowermost side among the display module DM, the lower film FM, and the protective member PM.

Although not illustrated, components illustrated in FIG. 2A to FIG. 2C may be coupled to each other by an adhesive layer disposed between the components. Hereinafter, an adhesive layer to be described in the inventive concept may be an optically clear adhesive ("OCA") film, an optically clear resin ("OCR"), or a pressure sensitive adhesive ("PSA") film. In addition, the adhesive layer includes a light-curable adhesive material or a heat-curable adhesive material, and the material of the adhesive layer is not particularly limited thereto.

Referring to FIG. 2B, an electronic apparatus EA-1 according to another embodiment may include a window WM-1, an optical member OM-1, a display module DM-1, a lower film FM-1, a protective member PM-1 and a digitizer ZM-1.

In this embodiment, the protective member PM-1, the digitizer ZM-1, the lower film FM-1, the display module DM-1, and the optical member OM-1 of the electronic apparatus EA-1 may be sequentially disposed along the third direction DR3. Therefore, in an embodiment, the digitizer ZM-1 may be disposed between the lower film FM-1 and the protective member PM-1.

Referring to FIG. 2C, an electronic apparatus EA-2 according to still another embodiment may include a window WM-2, an optical member OM-2, a display module DM-2, a lower film FM-2, a protective member PM-2 and a digitizer ZM-2.

In this embodiment, the protective member PM-2, the lower film FM-2, the digitizer ZM-2, the display module DM-2, and the optical member OM-2 of the electronic apparatus EA-2 may be sequentially disposed along the third direction DR3. Therefore, in an embodiment, the digitizer ZM-2 may be disposed between the display module DM-2 and the lower film FM-2.

Although not illustrated, an electronic apparatus may include a lower film, a protective member, a digitizer, a display module, and an optical member sequentially laminated along the third direction DR3, and at this time, the digitizer may be disposed between the display module and the protective member. Also, the digitizer may be disposed on the display module, and is not limited to any one embodiment.

Figure 5:
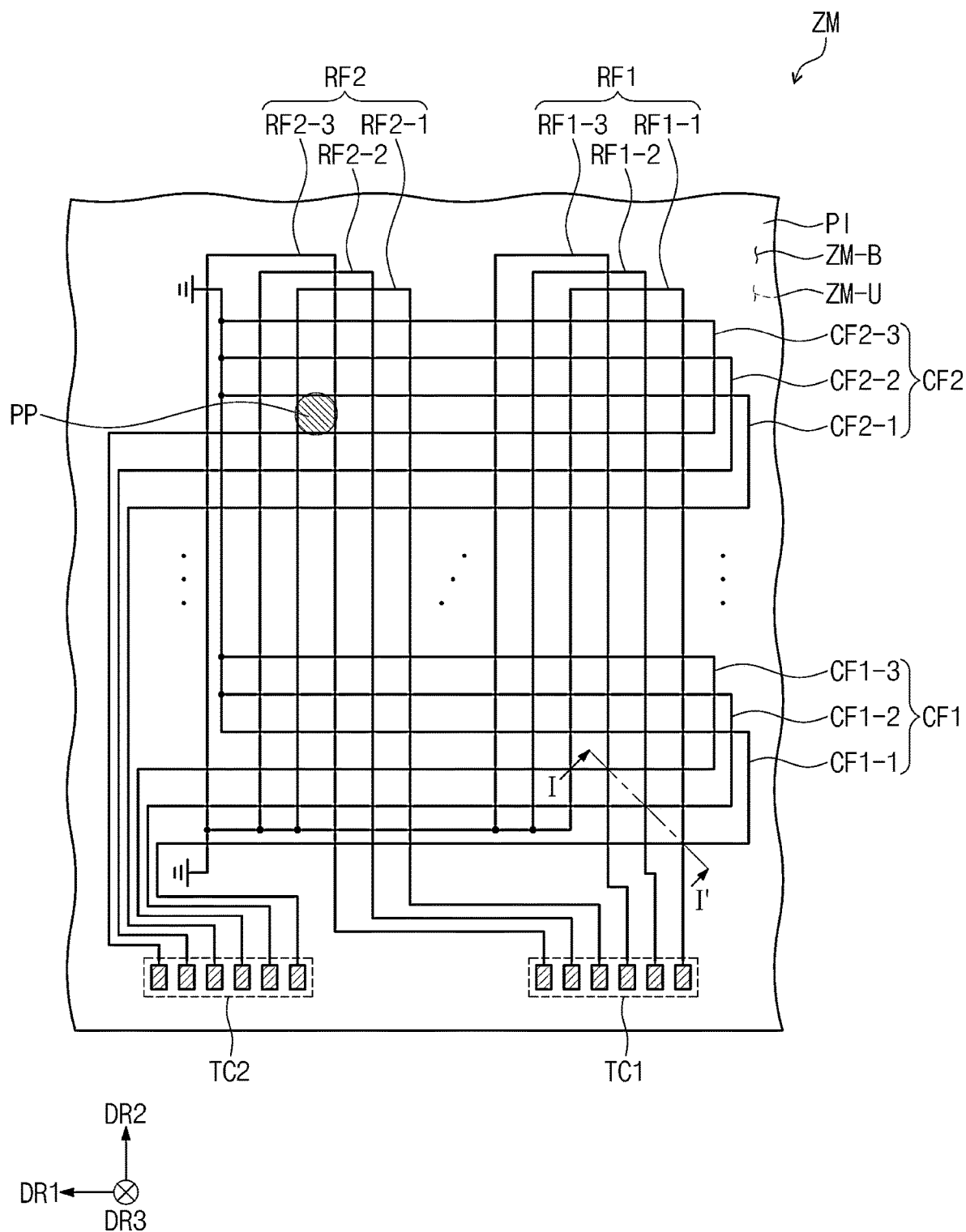
FIG. 5 is a bottom view of a digitizer according to an embodiment of the inventive concept.
Figure 6:
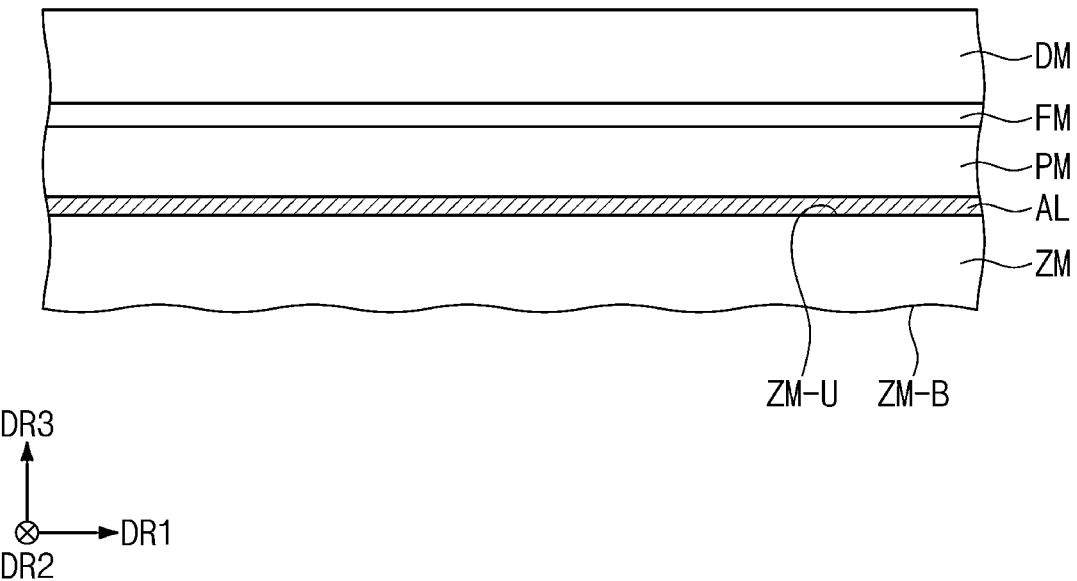
FIG. 6 is a cross-sectional view of a portion of an electronic apparatus according to an embodiment of the inventive concept.
Figure 7:
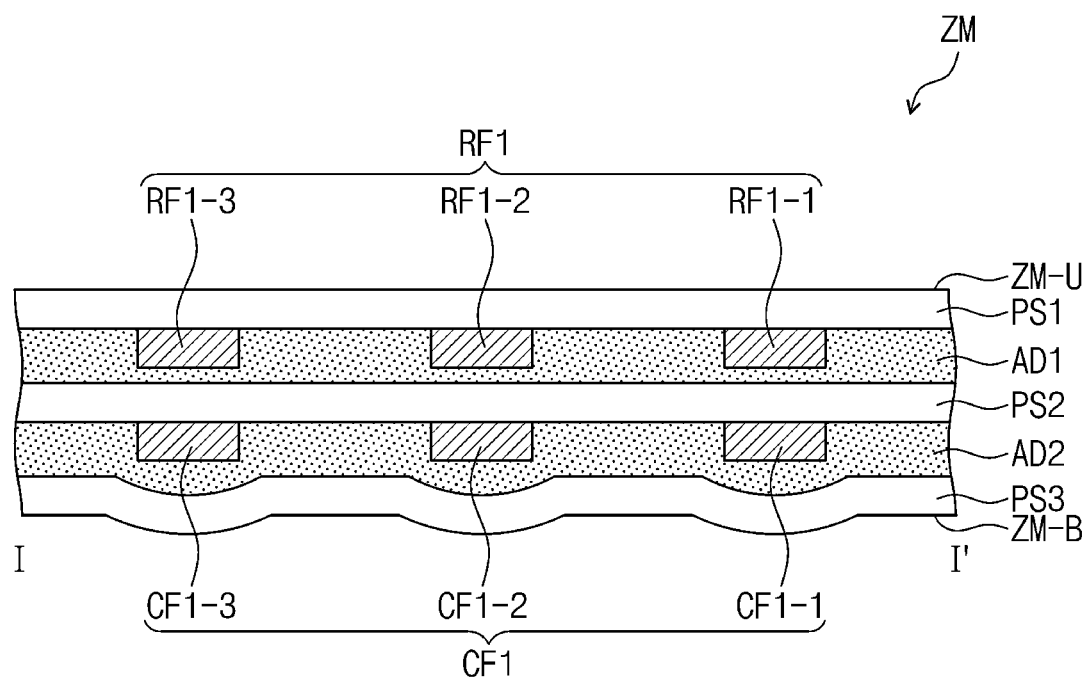
FIG. 7 is a cross-sectional view of a digitizer taken along line I-I' of FIG. 5 according to an embodiment of the inventive concept.

FIG. 5 is a bottom view of a digitizer ZM according to an embodiment of the inventive concept. FIG. 6 is a cross-sectional view of a portion of an electronic apparatus according to an embodiment of the inventive concept. FIG. 7 is a cross-sectional view of a digitizer taken along line I-I' of FIG. 5 according to an embodiment of the inventive concept. Hereinafter, in describing a digitizer according to an embodiment of the inventive concept with reference to FIG. 5 to FIG. 7, the same reference numerals are used for the same components as those of FIG. 1A to FIG. 4, and redundant descriptions thereof are omitted.

The digitizer ZM according to the inventive concept may sense an external input by an ElectroMagnetic Resonance (EMR) method.

The digitizer ZM may include photosensitive resin layers PS1, PS2, and PS3, digitizer sensors RF1, RF2, CF1, and CF2, and a plurality of digitizer pads TC1 and TC2. Also, the digitizer ZM may include a first surface ZM-U and a second surface ZM-B opposing the first surface ZM-U.

The photosensitive resin layers PS1, PS2, and PS3 may be base layers on which the digitizer sensors RF1, RF2, CF1, and CF2 are disposed. The photosensitive resin layers PS1, PS2, and PS3 may include an organic matter. The photosensitive resin layers PS1, PS2, and PS3 may include a photosensitive resin which is a polymer resin to which a photosensitive function is imparted. For example, a photosensitive resin layer PI may include a photosensitive polyimide. The photosensitive polyimide may be formed by coupling a photosensitive functional group to polyimide.

On one surface of each of the photosensitive resin layers PS1, PS2, and PS3, the plurality of digitizer sensors RF1, RF2, CF1, and CF2 are disposed, such that the digitizer sensors RF1, RF2, CF1, and CF2 may be disposed in the inside of the digitizer ZM.

First digitizer sensor RF1 includes a plurality of first sensing coils RF1-1, RF1-2, and RF1-3, and first digitizer sensor RF2 includes a plurality of first sensing coils RF2-1, RF2-2, and RF2-3. Second digitizer sensor CF1 includes a plurality of second sensing coils CF1-1, CF1-2, and CF1-3, and second digitizer sensor CF2 includes a plurality of second sensing coils CF2-1, CF2-2, and CF2-3. The plurality of first sensing coils RF1-1, RF1-2, RF1-3, RF2-1, RF2-2, and RF2-3 and the plurality of second sensing coils CF1-1, CF1-2, CF1-3, CF2-1, CF2-2, and CF2-3 may each include a metal. In an embodiment, the plurality of first sensing coils RF1-1, RF1-2, RF1-3, RF2-1, RF2-2, and RF2-3 and the plurality of second sensing coils CF1-1, CF1-2, CF1-3, CF2-1, CF2-2, and CF2-3 may each include copper (Cu).

The first digitizer sensors RF1 and RF2 correspond to input coils of the electromagnetic resonance type digitizer, and the second digitizer sensors CF1 and CF2 correspond to output coils of the electromagnetic resonance type digitizer.

The first sensing coils RF1-1, RF1-2, RF1-3, RF2-1, RF2-2, and RF2-3 and the second sensing coils CF1-1, CF1-2, CF1-3, CF2-1, CF2-2, and CF2-3 may be disposed while being insulated from each other in the photosensitive resin layer PI. Each of the first sensing coils RF1-1, RF1-2, RF1-3, RF2-1, RF2-2, and RF2-3 is connected to corresponding first digitizer pad TC1, and each of the second sensing coils CF1-1, CF1-2, CF1-3, CF2-1, CF2-2, and CF2-3 is connected to corresponding second digitizer pad TC2.

Each of the first sensing coils RF1-1, RF1-2, RF1-3, RF2-1, RF2-2, and RF2-3 receives scan signals which are activated in different intervals. Each of the first sensing coils RF1-1, RF1-2, RF1-3, RF2-1, RF2-2, and RF2-3 generates a magnetic field in response to a corresponding scan signal.

When the pen SP (see FIG. 1A) is adjacent to the first sensing coils RF1-1, RF1-2, RF1-3, RF2-1, RF2-2, and RF2-3, a magnetic field induced from the first sensing coils RF1-1, RF1-2, RF1-3, RF2-1, RF2-2, and RF2-3 resonates with a resonance circuit of the pen SP. The pen SP generates a resonance frequency. Here, the pen SP may be a pen having an LC resonance circuit including an inductor and a capacitor.

The second sensing coils CF1-1, CF1-2, CF1-3, CF2-1, CF2-2, and CF2-3 outputs sense signals according to the resonance frequency of an input means to the second digitizer pads TC2.

In a region in which a second coil RF2-2 among the first sensing coils RF1-1, RF1-2, RF1-3, RF2-1, RF2-2, and RF2-3 and a second coil CF2-2 among the second sensing coils CF1-1, CF1-2, CF1-3, CF2-1, CF2-2, and CF2-3 cross, it is assumed that a central portion of the region above is an input point PP.

A sensing signal output from the second coil RF2-2 among the first sensing coils RF1-1, RF1-2, RF1-3, RF2-1, RF2-2, and RF2-3 has a higher level than sensing signals output from the rest of the first sensing coils RF1-1, RF1-2, RF1-3, RF2-1, and RF2-3.

A sensing signal output from the second coil CF2-2 among the second sensing coils CF1-1, CF1-2, CF1-3, CF2-1, CF2-2, and CF2-3 has a higher level than sensing signals output from the rest of the second sensing coils CF1-1, CF1-2, CF1-3, CF2-1, and CF2-3.

Sensing signals output from a first coil CF2-1 and a third coil CF2-3 among the second sensing coils CF2-1, CF2-2, and CF2-3 have a lower level than the sensing signal output from the second coil CF2-2, and the sensing signals output from the first coil CF2-1 and the third coil CF2-3 have a higher level than sensing signals output from the rest of the second sensing coils CF1-1, CF1-2, and CF1-3.

Based on the time at which the sensing signal output from the second coil CF2-2 having a high level was detected and the relative position of the second coil CF2-2 with respect to the second sensing coils CF1-1, CF1-2, CF1-3, CF2-1, and CF2-3, the two-dimensional coordinate information of the input point PP by the pen SP may be calculated.

Referring to FIG. 6 and FIG. 7, the digitizer ZM according to an embodiment may include the first surface ZM-U (a front surface) and the second surface ZM-B (a rear surface). The first surface ZM-U may be disposed relatively adjacent to the display module DM compared to the second surface ZM-B.

In an embodiment, the first surface ZM-U may be relatively flat compared to the second surface ZM-B. The first surface ZM-U and the second surface ZM-B may have different surface roughness. In an embodiment, the surface roughness of the first surface ZM-U may be smaller than the surface roughness of the second surface ZM-B. For example, the surface roughness of the first surface ZM-U may be about 1 micrometers (μm) to about 10 μm, and the surface roughness of the second surface ZM-B may be about 5 μm to about 15 μm. In the present disclosure, roughness (including surface roughness to be described hereinafter) may be measured through predetermined equipment. For example, the range of roughness as set forth herein may be a value measured through the "VK-X200 Laser Scanning Microscope" equipment of "Keyence Co., Ltd."

The digitizer ZM according to an embodiment includes a first photosensitive resin layer PS1, a first sensing coil RF1, a first adhesive layer AD1, and a second photosensitive resin layer PS2 sequentially laminated on a cross-section. On the second photosensitive resin layer PS2, a second sensing coil CF1, a second adhesive layer AD2, and a third photosensitive resin layer PS3 may be sequentially further laminated.

Each of the first to third photosensitive resin layers PS1, PS2, and PS3 may include a photosensitive resin. Each of the first to third photosensitive resin layers PS1, PS2, and PS3 may include a photosensitive polyimide. Each of the first to third photosensitive resin layers PS1, PS2, and PS3 may include a photosensitive resin having a low storage modulus compared to a resin to which photosensitive properties are not imparted. In an embodiment, each of the first to third photosensitive resin layers PS1, PS2, and PS3 may have a storage modulus of about 0.5 Gigapascals (GPa) to about 2 GPa.

The first sensing coil RF1 may be disposed on the first photosensitive resin layer PS1, and the second sensing coil CF1 may be disposed on the second photosensitive resin layer PS2. The first adhesive layer AD1 is interposed between the first photosensitive resin layer PS1 and the second photosensitive resin layer PS2, and thus, may adhere the first photosensitive resin layer PS1 and the second photosensitive resin layer PS2. The second adhesive layer AD2 is interposed between the second photosensitive resin layer PS2 and the third photosensitive resin layer PS3, and thus, may adhere the second photosensitive resin layer PS2 and the third photosensitive resin layer PS3.

The first adhesive layer AD1 may cover the entire upper portion of the first sensing coil RF1 disposed on the first photosensitive resin layer PS1. The second adhesive layer AD2 may cover the entire upper portion of the second sensing coil CF1 disposed on the second photosensitive resin layer PS2. The first adhesive layer AD1 and the second adhesive layer AD2 may be an optically clear adhesive (OCA) film, or a pressure sensitive adhesive (PSA) film. The thickness of each of the first adhesive layer AD1 and the second adhesive layer AD2 in the third direction DR3 may be about 10 μm to about 15 μm. As the thickness of the first adhesive layer AD1 and the thickness of the second adhesive layer AD2 satisfy the above range, adhesive force for adhering each of the photosensitive resin layers PS1, PS2, and PS3 may be secured, electrical interference such as crosstalk may be prevented from being generated between the first sensing coil RF1 and the second sensing coil CF1, and the overall thickness of the digitizer ZM may be controlled to allow the digitizer ZM to have a suitable rigidity even when applied to an electronic apparatus to be folded.

The digitizer ZM according to an embodiment includes a photosensitive resin layer having a low storage modulus of about 0.5 GPa to about 2 GPa as a base layer on which sensing coils are disposed. Through the above, the rigidity of the digitizer ZM is reduced such that the digitizer ZM according to an embodiment may be applied to an electronic apparatus to be folded, and the surface roughness of the digitizer ZM is reduced such that the digitizer ZM according to an embodiment may be applied to a thinner electronic apparatus. In addition, due to a structure in which the photosensitive resin layers in which the sensing coils are disposed are adhered to each other through adhesive layers, it is possible to manufacture the digitizer ZM applied to an electronic apparatus to be folded through a simple process including a base layer forming process, a sensing coil forming process, an adhesive layer forming process, and an adhering process.

Figure 8:
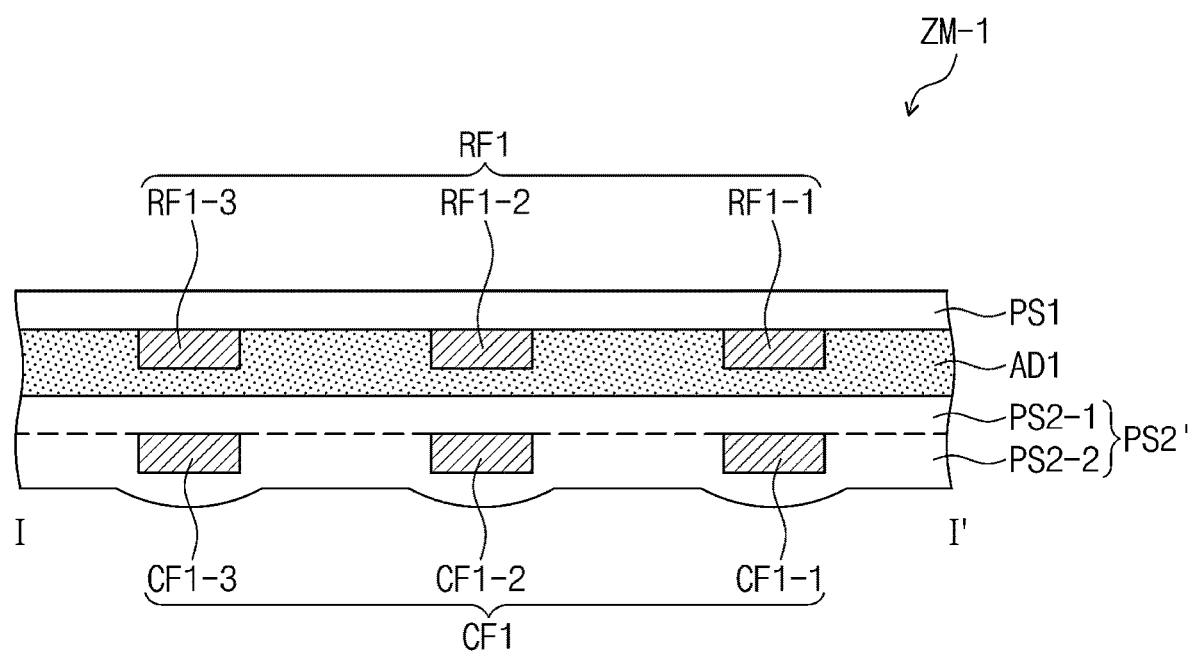
FIG. 8 is a cross-sectional view of a digitizer taken along line I-I' of FIG. 5 according to another embodiment of the inventive concept.
Figure 9:
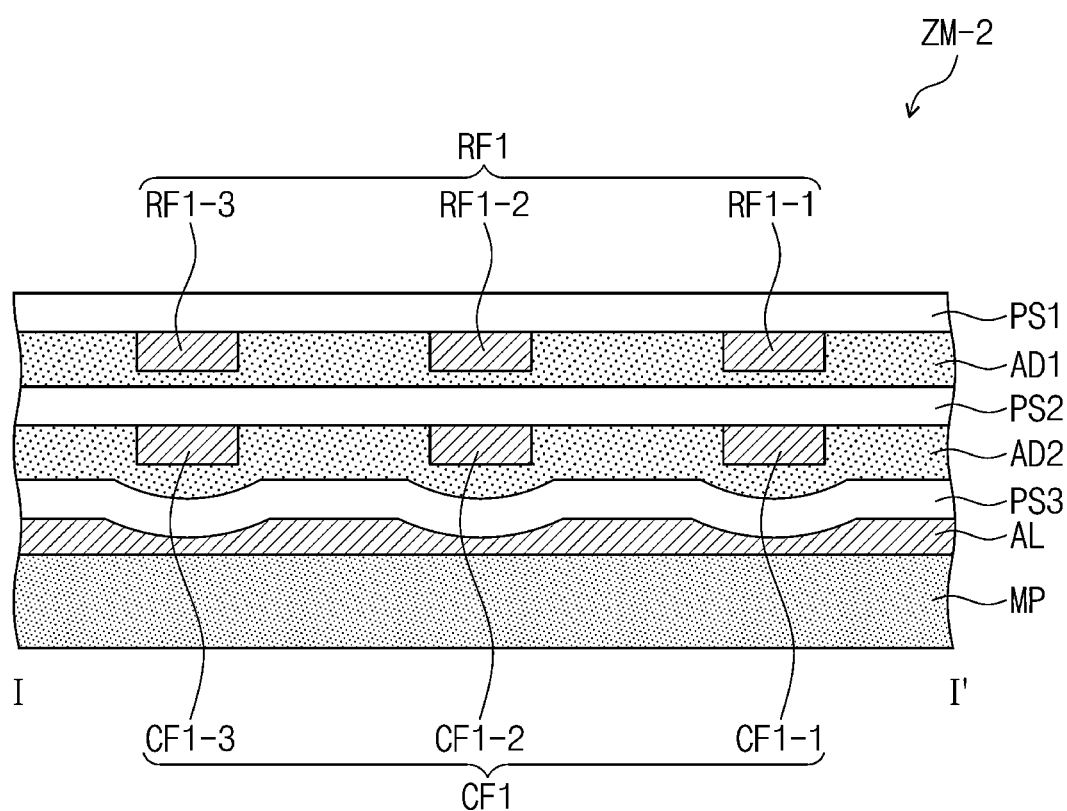
FIG. 9 is a cross-sectional view of a digitizer taken along line I-I' of FIG. 5 according to still another embodiment of the inventive concept.
Figure 10A:
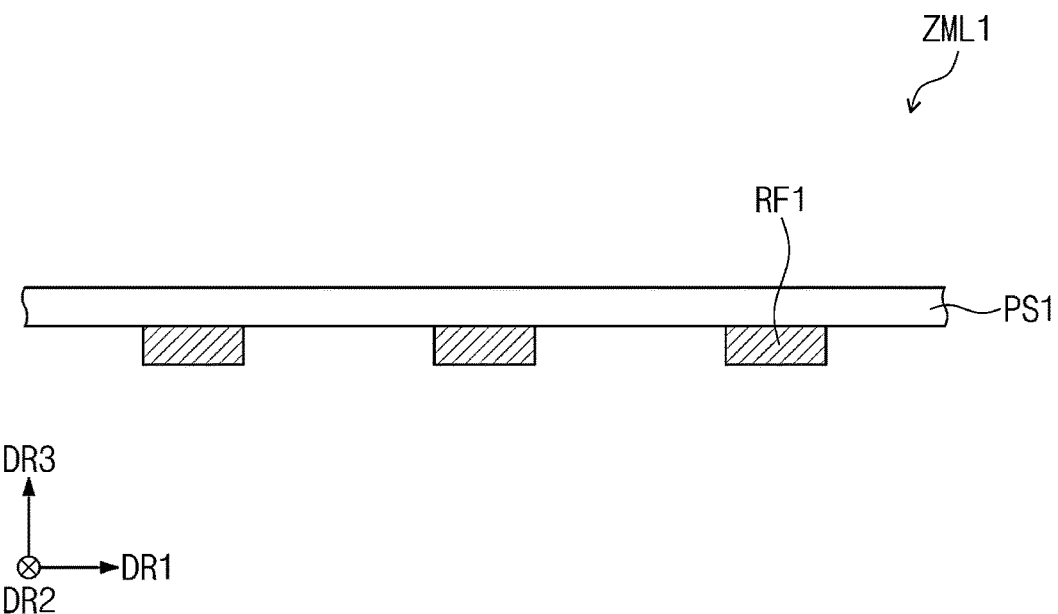
FIG. 10A to FIG. 10D are cross-sectional views sequentially showing a method for manufacturing a digitizer according to an embodiment of the inventive concept.
Figure 10B:
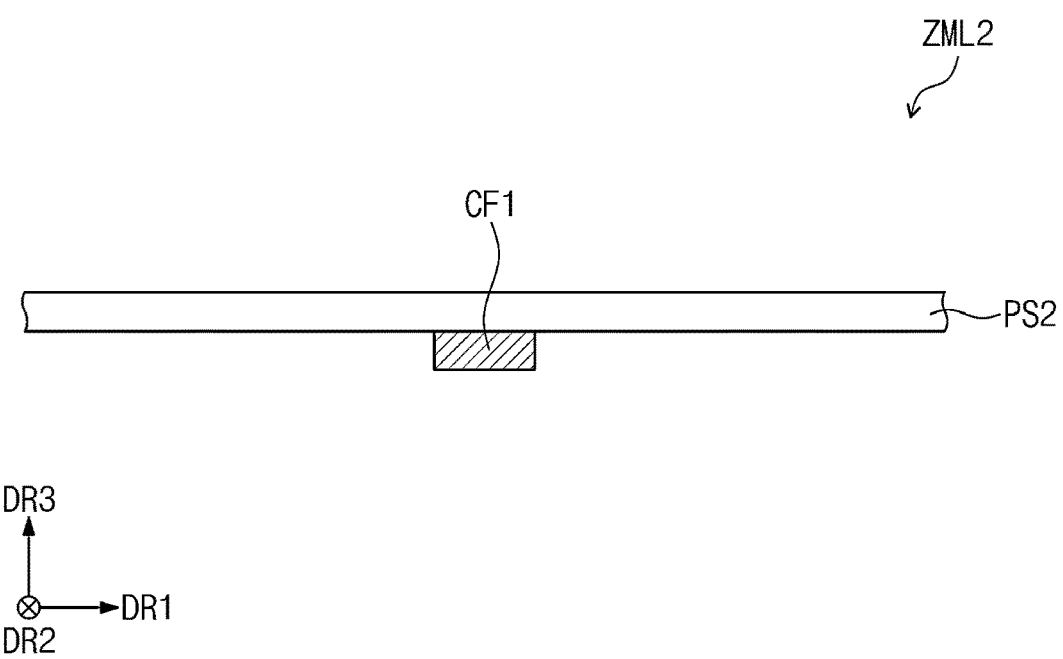
Figure 10C:
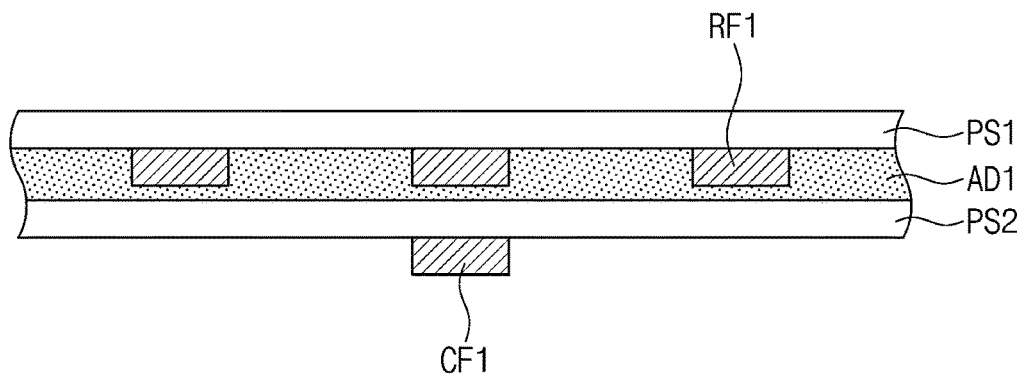
Figure 10C:
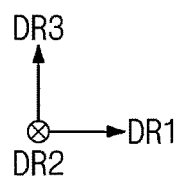
Figure 10D:
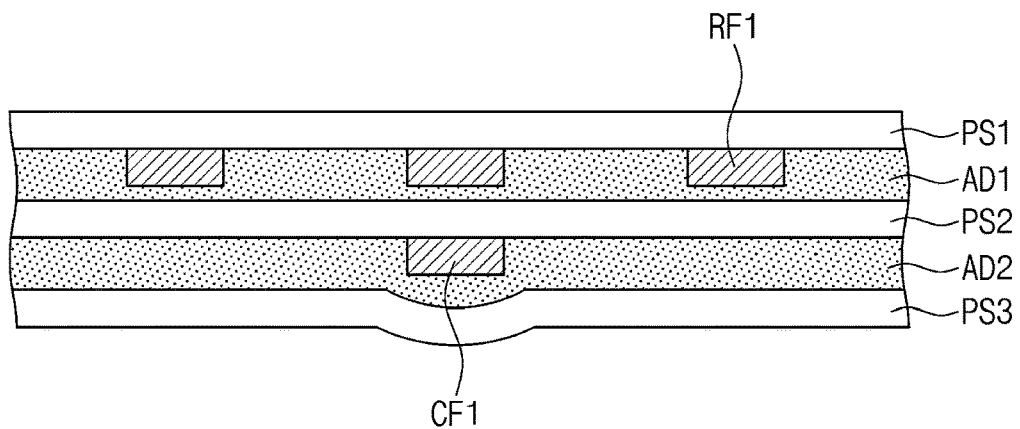
Figure 10D:
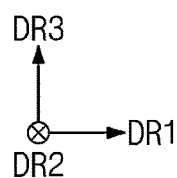

FIG. 8 and FIG. 9 are cross-sectional views of a digitizer taken along line I-I' of FIG. 5 according to other embodiments of the inventive concept. Hereinafter, in describing digitizers ZM-1 and ZM-2 according to an embodiment of the inventive concept with reference to FIG. 8 and FIG. 9, the same reference numerals are used for the same components as those described above, and redundant descriptions thereof are omitted.

Referring to FIG. 8, a digitizer ZM-1 according to an embodiment includes a first photosensitive resin layer PS1, the first sensing coil RF1, the first adhesive layer AD1, and a second photosensitive resin layer PS2'. The second sensing coil CF1 may be disposed in the inside of the second photosensitive resin layer PS2'. In an embodiment, the second sensing coil CF1 may be embedded in the second photosensitive resin layer PS2'.

The second photosensitive resin layer PS2' may include a first sub-photosensitive resin layer PS2-1 for providing a base surface on which the second sensing coil CF1 is disposed and a second sub-photosensitive resin layer PS2-2 for covering a lower portion of the second sensing coil CF1 as shown in FIG. 8. The first sub-photosensitive resin layer PS2-1 and the second sub-photosensitive resin layer PS2-2 may have an integral shape (i.e., monolithic). The first sub-photosensitive resin layer PS2-1 and the second sub-photosensitive resin layer PS2-2 may be formed of or include the same material. In an embodiment, the first sub-photosensitive resin layer PS2-1 and the second sub-photosensitive resin layer PS2-2 may include a photosensitive polyimide having a storage modulus of about 0.5 GPa to about 2 GPa. The second photosensitive resin layer PS2' may be formed by forming the first sub-photosensitive resin layer PS2-1 with a photosensitive polyimide, forming the second sensing coil CF1 on the first sub-photosensitive resin layer PS2-1, and then coating the photosensitive polyimide to cover the second sensing coil CF1 to form the second sub-photosensitive resin layer PS2-2.

Referring to FIG. 9, a digitizer ZM-2 according to an embodiment may further include a shielding layer MP disposed on the third photosensitive resin layer PS3. The third photosensitive resin layer PS3 and the shielding layer MP may be adhered by an additional adhesive layer AL. FIG. 9 exemplarily illustrates that the shielding layer MP is further disposed on the digitizer ZM illustrated in FIG. 7, but the embodiment of the inventive concept is not limited thereto. The shielding layer MP may be additionally disposed on the digitizer ZM-1 illustrated in FIG. 8.

Referring to FIG. 6 and FIG. 9 together, the shielding layer MP may be disposed on a relatively uneven surface among surfaces of the digitizer ZM-2. For example, the shielding layer MP may be disposed on the second surface ZM-B. The shielding layer MP may be disposed on the second surface ZM-B opposing the first surface ZM-U which is adjacent to the display module DM. In an embodiment, the shielding layer MP may include a metal. For example, the shielding layer MP may be a layer containing a magnetic metal powder (MMP). The shielding layer MP may prevent electrical interference between components disposed on a lower portion of the digitizer ZM-2 and components disposed opposite to the lower portion of the digitizer ZM-2 with respect to the shielding layer MP. Accordingly, an electronic apparatus with improved reliability may be provided.

Hereinafter, the inventive concept will be described in more detail through properties values when the digitizers of specific Examples and Comparative Examples are applied to an electronic apparatus. The following examples are for illustrative purposes only to facilitate the understanding of the inventive concept, and thus, the scope of the inventive concept is not limited thereto.

[Electronic Apparatus Properties Comparison]

The surface roughness, rigidity, folding properties, and visibility properties were measured when the digitizers of Examples and Comparative Examples were applied to an electronic apparatus, and the results are shown in Table 1 below. In Example 1, in the structure illustrated in FIG. 7, a digitizer having a base layer on which a sensing coil is disposed formed through a photosensitive polyimide is applied to manufacture an electronic apparatus. In Example 2, in the structure illustrated in FIG. 8, a digitizer having a base layer on which a sensing coil is disposed formed through a photosensitive polyimide is applied to manufacture an electronic apparatus. In Comparative Example 1, an electronic apparatus was manufactured in the same manner as in Example 1 except that polyimide was applied instead of photosensitive polyimide when forming a base layer in the electronic apparatus of Example 1. In each of Example 1 and Example 2, a base layer was formed through a photosensitive polyimide having a storage modulus of about 1 GPa, and in Comparative Example 1, a base layer was formed through polyimide having a storage modulus of about 4 GPa.

TABLE 1

| Classification | Surface roughness (μm) | Rigidity (millinewton: mN) | Folding properties | Visibility properties |
| --- | --- | --- | --- | --- |
| Example 1 | 2 | 13 | After folding at least 200K (thousands) OK | Wiring projection X (No) |
| Example 2 | 2 | 11 | After folding at least 200K OK | Wiring projection X (No) |
| Comparative Example 1 | 26 | 70 | When folding 1K or less N.G. (not good) | Wiring projection O (Yes) |

Referring to the results of Table 1 above, an electronic apparatus according to an embodiment was applied with a digitizer having a base layer formed through a photosensitive polyimide having a low storage modulus, and thus, an electronic apparatus having low surface roughness and rigidity, improved folding properties, and visibility properties was provided. Hereinafter, a method for manufacturing a digitizer in a method for manufacturing an electronic apparatus according to an embodiment of the inventive concept will be described with reference to the accompanying drawings. The method for manufacturing an electronic apparatus according to an embodiment includes disposing a display panel on a lower side of a window and disposing a digitizer on a lower side of the display panel.

FIG. 10A to FIG. 10D are cross-sectional views sequentially showing a method for manufacturing a digitizer according to an embodiment of the inventive concept.

Referring to FIG. 10A to FIG. 10D, a step of manufacturing a digitizer according to an embodiment includes preparing a first layer ZML1 by forming the first sensing coil RF1 on the first photosensitive resin layer PS1, preparing a second layer ZML2 including the second photosensitive resin layer PS2, and adhering the first layer ZML1 and the second layer ZML2 by providing the first adhesive layer AD1 therebetween to cover the first sensing coil RF1. In the method for manufacturing a digitizer according to an embodiment, the first adhesive layer AD1 for adhering the first layer ZML1 and the second layer ZML2 may be formed first on the first photosensitive resin layer PS1 to cover the first sensing coil RF1, and then adhere the second layer ZML2. Alternatively, the first adhesive layer AD1 may be formed first on an upper surface of the second photosensitive resin layer PS2, and then the first sensing coil RF1 may be covered by the first adhesive layer AD1 in a step of adhering to the first layer ZML1.

In the step of manufacturing a digitizer according to an embodiment, the step of preparing the second layer ZML2 may include a step of forming the second sensing coil CF1 on the second photosensitive resin layer PS2. The first layer ZML1 and the second layer ZML2 are adhered by the first adhesive layer AD1, and then the third photosensitive resin layer PS3 may be adhered on the second photosensitive resin layer PS2 by the second adhesive layer AD2.

In the manufacturing method of a digitizer according to an embodiment, a base layer on which a sensing coil is disposed through a photosensitive resin having a low storage modulus may be formed to be applied to manufacturing of an electronic apparatus to be folded by having reduced surface roughness and rigidity. Also, since layers each having a base layer formed with a sensing coil are adhered to each other through an adhesive layer, it is possible to manufacture a digitizer applicable to an electronic apparatus to be folded without a separate process, so that a process of manufacturing a foldable display device may be simplified and costs may be reduced.

According to an embodiment of the inventive concept, a digitizer may be applied to a foldable electronic apparatus to sense an input through a pen and the like, and also, the digitizer may be manufactured through a simple process, thereby improving the mass productivity and reliability of the electronic apparatus.

Although the inventive concept has been described with reference to a preferred embodiment of the inventive concept, it will be understood by those skilled in the art that various changes in form and details may be made therein without departing from the spirit and scope of the inventive concept as set forth in the claims below. For example, FIGS. 2A to 2C and FIGS. 6 to 9 and descriptions thereof describes mainly a case that the digitizer ZM is disposed near the first display surface FS to sense the signal transmitted by the pen SP on the first display surface FS, the invention is not limited thereto. In another embodiment, the same structures shown in FIGS. 2A to 2C and FIGS. 6 to 9 are also disposed near the second display surface RS such that the electronic device EA may further sense another signal transmitted by the pen SP on the second display surface RS.

Accordingly, the technical scope of the inventive concept is not intended to be limited to the contents set forth in the detailed description of the specification, but is intended to be defined by the appended claims.

What is claimed is:

1. An electronic apparatus comprising:
   a window;
   a display panel disposed on a lower surface of the window; and
   a digitizer disposed on a lower surface of the display panel,
   wherein the digitizer includes:

a first resin layer;

a first sensing coil disposed on one surface of the first resin layer;

a second resin layer disposed spaced apart from the first resin layer; and a first adhesive layer disposed between the first resin layer and the second resin layer and which adheres the first resin layer and the second resin layer; and a second sensing coil disposed spaced apart from the first adhesive layer, and at least a portion of the second resin layer is disposed between the second sensing coil and the first adhesive layer, wherein each of the first resin layer and the second resin layer has a storage modulus of about 0.5 Gigapascal (GPa) to about 2 GPa.

2. The electronic apparatus of claim 1, wherein the digitizer further comprises:

a second adhesive layer disposed on the second resin layer to cover the second sensing coil; and a third resin layer disposed spaced apart from the second resin layer, and the second adhesive layer is disposed between the second resin layer and the third resin layer.

3. The electronic apparatus of claim 1, wherein the second resin layer comprises:

a first sub resin layer which provides a reference surface on which the second sensing coil is disposed; and a second sub resin layer disposed on the first sub resin layer and which covers the second sensing coil, wherein the first sub resin layer and the second sub-resin layer have an integral shape.

4. The electronic apparatus of claim 1, wherein the first adhesive layer covers an entire upper portion of the first sensing coil.

5. The electronic apparatus of claim 1, wherein the digitizer further comprises a shielding layer disposed on a lower surface of the second resin layer, and the shielding layer contains magnetic metal powder (MMP).

6. The electronic apparatus of claim 1, further comprising at least one of a lower film and a protection member, disposed on a lower surface of the display panel.

7. The electronic apparatus of claim 6, wherein the digitizer is disposed on a lower surface of a combination of the display panel, the lower film, and the protection member, between the display panel and the lower film, between the lower film and the protection member, or between the display panel and the protection member.

8. The electronic apparatus of claim 1, further comprising:

a folding region which is foldable with respect to a virtual folding axis extended in one direction, a first non-folding region extended toward one side of the folding region, and a second non-folding region extended toward another side of the folding region.

9. The electronic apparatus of claim 1, further comprising: at least one of a sensor disposed between the window and the display panel and an optical member.

10. The electronic apparatus of claim 1, wherein the digitizer further comprises a first surface adjacent to the display panel and a second surface opposing the first surface, and surface roughness of the first surface is smaller than surface roughness of the second surface.

11. The electronic apparatus of claim 10, wherein the surface roughness of the first surface is about 1 micrometers (μm) to about 10 μm.

12. The electronic apparatus of claim 1, wherein the first resin layer and the second resin layer each comprise a polyimide.

13. An electronic apparatus comprising:

a window;

a display panel disposed on a lower surface of the window; and a digitizer disposed on a lower surface of the display panel, wherein the digitizer includes:

a first resin layer;

a first sensing coil disposed on one surface of the first resin layer; and an adhesive layer disposed to cover the first sensing coil, wherein the first resin layer has a storage modulus of about 0.5 GPa to about 2 GPa.

14. The electronic apparatus of claim 13, wherein the first resin layer comprises a polyimide.

15. The electronic apparatus of claim 13, wherein the digitizer further comprises a surface adjacent to the display panel, and surface roughness of the surface of the digitizer is about 1 μm to about 10 μm.

16. The electronic apparatus of claim 13, wherein the digitizer further comprises a second resin layer spaced apart from the first resin layer, and a second sensing coil disposed spaced apart from the adhesive layer, wherein the adhesive layer is disposed between the first resin layer and the second resin layer, and at least a portion of the second resin layer is disposed between the adhesive layer and the second sensing coil.

17. The electronic apparatus of claim 16, wherein the digitizer further comprises a third resin layer disposed on the second resin layer.

18. A method for manufacturing an electronic apparatus, the method comprising:

disposing a display panel on a lower surface of a window; and manufacturing a digitizer and disposing the digitizer on a lower surface of the display panel, wherein manufacturing the digitizer includes:

preparing a first layer by forming a sensing coil on a first resin layer;

preparing a second layer including a second resin layer; and adhering the first layer and the second layer by providing an adhesive layer to cover the sensing coil, wherein the first resin layer has a storage modulus of about 0.5 GPa to about 2 GPa.

* * * * *